United States Patent
Marchand et al.

(10) Patent No.: US 6,801,607 B1
(45) Date of Patent: Oct. 5, 2004

(54) SYSTEM AND METHOD FOR PREVENTING FRAUDULENT CALLS USING A COMMON BILLING NUMBER

(75) Inventors: Dean C. Marchand, Longmont, CO (US); Erin C. Jackman, Denver, CO (US); Ron Zimmerman, Lakewood, CO (US)

(73) Assignee: MCI, Inc., Asburn, VA (US)

( * ) Notice: Subject to any disclaimer, the term of this patent is extended or adjusted under 35 U.S.C. 154(b) by 0 days.

(21) Appl. No.: 09/850,708

(22) Filed: May 8, 2001

(51) Int. Cl.[7] ............................................... H04M 15/00
(52) U.S. Cl. .............. 379/114.14; 379/111; 379/114.15; 379/114.19; 379/189
(58) Field of Search .......................... 379/114.14, 111, 379/114.15, 114.19, 189, 114.01, 115.01, 114.2, 114.28, 112.01, 112.06, 133, 190, 196, 191, 188

(56) References Cited

U.S. PATENT DOCUMENTS

| | | | | |
|---|---|---|---|---|
| 5,495,521 A | * | 2/1996 | Rangachar | ............... 379/93.04 |
| 5,602,906 A | * | 2/1997 | Phelps | .................... 379/114.14 |
| 5,689,550 A | * | 11/1997 | Garson et al. | ........... 379/88.18 |
| 5,768,354 A | | 6/1998 | Lange et al. | |
| 5,805,686 A | | 9/1998 | Moller et al. | |
| 5,809,125 A | * | 9/1998 | Gammino | .................... 379/189 |
| 5,875,236 A | * | 2/1999 | Jankowitz et al. | ...... 379/114.24 |
| 5,907,602 A | * | 5/1999 | Peel et al. | ............. 379/114.14 |
| 5,970,129 A | * | 10/1999 | Asfar et al. | ............ 379/144.01 |
| 6,418,212 B1 | * | 7/2002 | Harrison et al. | ............ 379/189 |

* cited by examiner

*Primary Examiner*—Duc Nguyen
*Assistant Examiner*—Barry W Taylor

(57) ABSTRACT

In a telecommunication network, there is provided a system for monitoring a plurality of telephone calls to a common private branch exchange, PBX) in order to detect fraudulent activity. In particular, fraudulent activity is detected in calls made to and originating from a PBX that uses a common billing number. If fraudulent activity is found, an alert message is provided to a fraud analyst for further review. Call detail records corresponding to each of the calls, are retrieved and stored in a queue. The billing number and a call time associated with each call detail record are analyzed. Each call detail record, billing number and call time is compared with at least one predetermined threshold relating to billing numbers and call times.

13 Claims, 5 Drawing Sheets

SYSTEM AND METHOD FOR PREVENTING FRAUDULENT CALLS USING A COMMON BILLING NUMBER

BACKGROUND OF THE INVENTION

1. Technological Field

This application relates generally to preventing fraudulent access to a telecommunications system. In particular, this application relates to identifying fraudulent calls made to and originating from a private branch exchange (PBX) that use a common billing number.

2. Description of the Related Art

Fraud costs the telecommunications industry millions of dollars per year. While the telecommunications industry struggles to prevent fraud and its devastating financial effects, the number of techniques that are used to perpetrate fraud continue to increase. The fraud can be as simple as using a stolen credit card to charge a long distance call, or it can involve sophisticated call looping techniques, such as repeatedly calling a PBX, finding tne correct sequence to access an outside line (by trial and error or other hacking techniques) and then placing a costly long distance call through the PBX system. Regardless of the type of fraud, the telecommunications industry is involved in an intensive and ongoing effort to identify different types of fraud and to develop and implement ways of preventing such fraud.

Particular methods of fraud control and systems for implementing them are known in the industry. Fraud control may be divided conceptually into identifying a call that is likely to be fraudulent and responding after a call is identified as likely to be fraudulent. Specifically, a fraud analyst uses billing detail records (BDRs) to validate call attempts in an effort to identify a fraudulent call and uses call detail records (CDRS) in an effort to respond to fraud when a call has been completed. Methods of identifying calls that are likely to be fraudulent vary from the simple to the sophisticated and are generally directed at a particular type of fraudulent activity. For example, a call is likely to be fraudulent if it is made using a calling card that has been reported stolen by the owner. The BDRs and CDRs contain information pertaining to the calls. Each CDR and BDR contain an originating number (where the call is from), a terminating number (where the call is to), and a billing number (where the cost of the call is charged to).

A sophisticated method and system of identifying fraudulent calls is described in U.S. Pat. No. 5,768,354 ('354), entitled "Fraud Evaluation And Reporting System and Method Thereof", which is owned by the assignee of the present invention, the contents of which are hereby incorporated by reference. Fraudulent activity is identified in the '354 patent by monitoring billing detail records (BDRs) that are created for each call in real time. In the simple case, where the company's database shows that the billing number being used for a call has been reported lost, stolen, etc., the billing detail record includes a header designating it as a "bad billing number". The call is immediately identified as fraudulent, and an alert is generated in the system. A fraud analyst monitors the alerts and takes appropriate actions depending upon the type of alert generated.

The '354 patent is directed at calls that require "special service", that is, which are placed through an operator or an automatic operation support system. Such calls generally require the caller to manually supply the billing number, such as by pressing numbers on a payphone, swiping the magnetic strip on a card, or speaking with an operator. It may also require the caller to identify the category of billing product (such as credit card, calling card, or pre-paid phone card) for the billing number. The category of the billing product may alternatively be identified by the system by matching all or part of the billing number with billing numbers (or ranges of billing numbers) stored in an identification database, where the stored billing numbers are correlated with the category of billing product. The identification database may also correlate a billing number with the particular type of billing product for the category. For example, where the category of the billing number is identified as a credit card, the identification database may use the billing number to further identify the type of credit card, such as Visa, Master Card, American Express, etc.

The '354 patent also identifies fraudulent activity by monitoring use of a billing number over time. For example, where the number of domestic calls placed within a certain amount of time using the same billing number exceeds a threshold, an alert is generated. Such use could signify that the billing number has been stolen and is being used to place multiple calls. International calls are handled in a similar fashion. However, due to the costly nature of international calls, the threshold value may be adjusted so that fewer calls within the time period generate an alert. In addition, the threshold may be further adjusted for calls to countries where a high percentage of fraudulent calls are directed. The thresholds may also be varied by the billing product. For example, fraudulent activity may be determined to be more likely to occur on a calling card than on a third party call; consequently, the threshold may be set lower for calling card products. The '354 patent monitors all calls made for that billing number, regardless of where the calls originate from or are directed to.

While monitoring BDRs and their associated billing numbers and blocking those numbers displaying evidence of fraudulent usage, i.e. numerous call attempts over a period of time, is an important component of fraud prevention, no one technique in and of itself is sufficient to prevent fraudulent access. Perpetrators of fraud (also referred to herein as "hackers") are persistent, creative and constantly developing new ways of evading fraud prevention mechanisms.

For example, a hacker may attempt to hack into a private branch exchange (PBX) in order to access information or to use the PBX to make a subsequent call. In the latter case, the call to the PBX may be a local or domestic call, which is less likely to attract attention, whereas the subsequent call made from the PBX may be a costly international call. In addition, hackers may use a PBX in a remote area to access a telephone number that is restricted if dialed directly from the hacker's phone. In this manner, the hacker uses a technique called "call looping" to loop around a restricted telephone leg in order to gain access to the blocked number.

A system of detecting fraudulent calls made to a PBX is described in U.S. Pat. No. 5,805,686 ('686), entitled "Telephone Fraud Detection System", which is owned by the assignee of the present invention and whose contents of which are hereby incorporated by reference. The system disclosed in the '686 patent collects call detail records (CDRs) and allows long distance phone customers the ability to monitor usage of their PBX and assign a risk factor to a plurality of recognized call types and destinations. Based upon the generated risk values, fraud analyst determines whether or not to block future access to the PBX for the originating, terminating, or billing number.

While these methods and systems are effective if a hacker makes many call attempts over a period of time, the systems may not detect hackers that break in to a PBX on one line, find an outside line with a different originating number, and call to another terminating number. Most fraud detection systems detect fraud by comparing either the originating numbers or the terminating numbers of the incoming call with the originating numbers or the terminating numbers of the outgoing call. If there are calls where the terminating number of the incoming call is the same as the originating number of the second call, the call may be a fraudulent call loop, and the call may be disconnected. In an effort to defeat these methods, hackers have devised methods of placing calls wherein the originating numbers and/or the terminating numbers are not the same for the call loop. Fortunately, for the telecommunication companies who are trying to prevent the fraudulent calls, in most cases the billing number for the call remains the same.

Thus, it would be desirable to have a system and method for identifying and blocking fraudulent call looping calls that use a common billing number.

SUMMARY OF THE INVENTION

It is therefore an object of the present invention to provide a system and method for preventing fraudulent calls using a common billing number.

It is also an object of the present invention to prevent the fraudulent use of a PBX by preventing call looping through the PBX.

It is an additional object of the present invention to detect multiple calls to a common PBX that use a common billing number.

In order to achieve the above and other objects, there is provided a system for identifying fraud in a telecommunications system, the system utilizes a host receiver for receiving call detail records (CDRs) which are generated for each call placed to a PBX. Each CDR contains at least an originating number, a terminating number, a billing number and a call start time corresponding to each call. The CDRs are stored in a CDR queue and are then analyzed using a CDR fraud detector to determine whether the calls are potentially fraudulent. If the calls are flagged as potentially fraudulent, the system generates an alert to a fraud analyst for additional consideration. The fraud analyst can then perform additional checks and add the number to an exception database if the call can be verified as legitimate. If the fraud analyst determines that the call is fraudulent, the billing number, originating number and/or terminating number may be blocked from the PBX.

The method for preventing fraudulent access and use of the PBX comprises the steps of receiving a call detail record for each call entering and leaving a PBX, storing the CDRs in a queue, purging previously stored CDRs in a fraud database that are older than a current time less a predetermined period of time, comparing each CDR billing number to previously stored CDRs in the fraud database, storing the CDR in the fraud database, and generating an alert when the billing number of the current CDR matches a billing number of a previously stored CDR in the fraud database.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
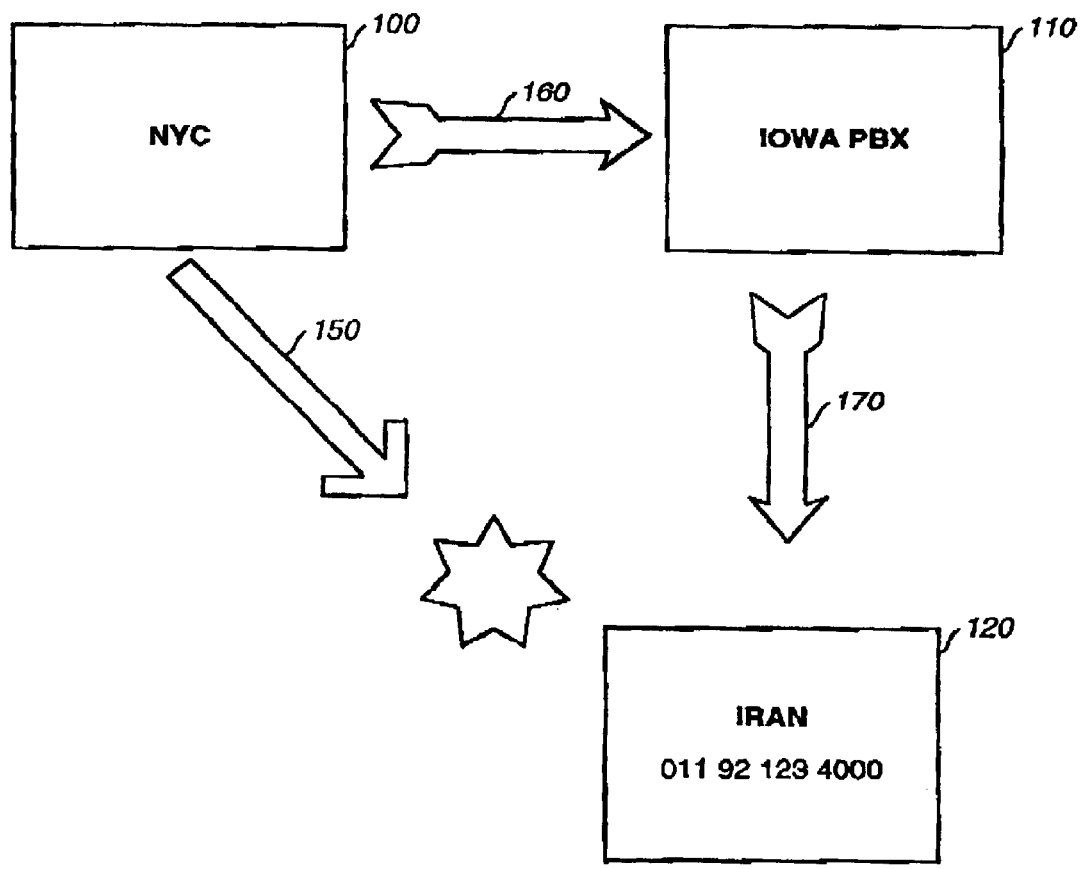
FIG. 1 is a block diagram illustrating the problem of call looping through a PBX using a common billing number.

Referring now to the drawings, in which similar reference characters denote similar or identical elements throughout several views, FIG. 1 shows a block diagram illustrating the problem of call looping through a private branch exchange (PBX) using a common billing number. Call looping occurs when there is a block imposed by a long distance telephone carrier which prevents the direct dialing of a number from a calling location 100 to a called location 120. In this example, calling location 100 is a location within New York City, and called location 120 is a location within the country of Iran. Assuming for the example posed in FIG. 1, that long distance calls between New York City and Iran have typically been of a fraudulent nature, the long distance companies, in an effort to reduce their losses associated with fraudulent calls, may impose a block for all calls originating from New York City to a location within the country of Iran. While this block may frustrate the purposes of hackers, they will resort to alternative methods to reach their destination.

Hackers use the previously described call looping technique to get around a blocked leg 150 from New York City to Iran. An example of call looping is as follows. Hackers who reside in calling location 100 attempt to dial a PBX 110 located in a location which is not commonly associated with fraudulent activity. The hacker dials into PBX 110, accesses an outgoing line, and dials called location 120. Since there is no block on a first leg 160 from calling location 100 to PBX 110 and no block along a second leg 170 from PBX 110 to called location 120, the hacker has successfully avoided blocked leg 150.

Upon completion of the call for each leg, a call detail record (CDR) is generated. The call detail record for first leg 160 includes an originating number field 101, a terminating number field 102, a billing number field 103, and a time of call field 107. Similarly, second leg 170 contains fields 104, 105, 106, and 108, respectively. When the hacker enters PBX 110, the hacker accesses a different PBX line to place the outgoing call. Therefore, neither the originating number or the terminating number of the incoming and outgoing calls are the same. In this regard, fraud detection means which detect common originating numbers or terminating numbers are unable to determine that a fraudulent call has been placed to PBX 110. Thus, the hacker has avoided fraud detection.

As set forth below, the present invention determines that within a predetermined period of time, an incoming and an outgoing call to PBX 110 has used the same billing number. The present invention recognizes this potentially fraudulent pattern and generates an alert to a fraud analyst for additional review.

Figure 2:
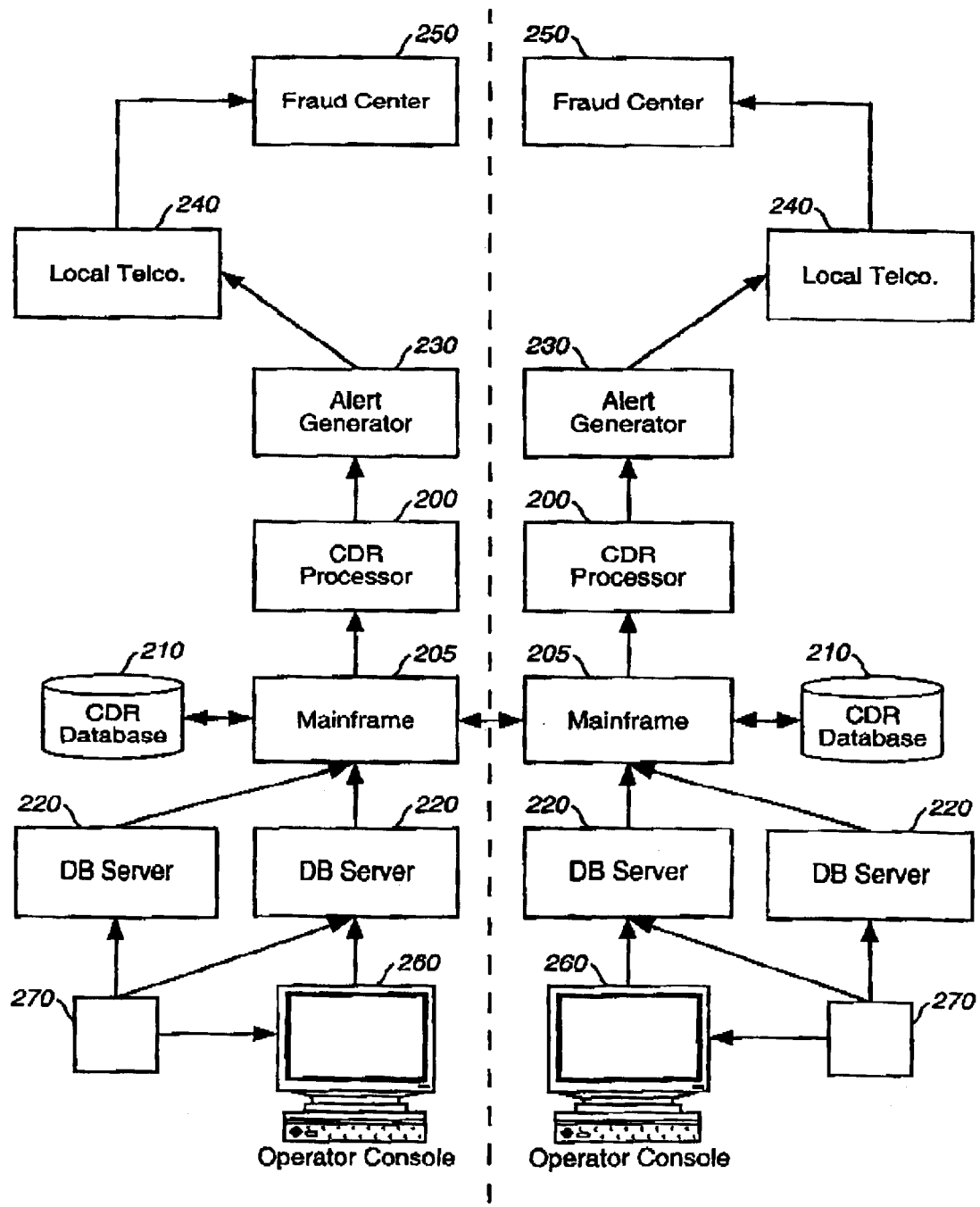
FIG. 2 is a block diagram illustrating the system in which the present invention operates.

Referring now to FIG. 2, there is a disclosed a block diagram illustrating the system in which the present invention operates. In an effort to simplify the description, the system will be described with reference to the left side of FIG. 2 only. It is understood, however, that multiple redundant systems may run simultaneously in order to assist in the reduction of processing time.

When a customer 270 places a long distance call, he may either access a long distance network directly through a database server 220 or through an operator console 260. Upon completion of the call, a call data record (CDR) is generated and forwarded to a main frame computer 205. The CDR contains an originating number (where the call is from), a terminating number (where the call is to), a billing number (where the cost of the call is charged to) and a call start time. The CDR is then stored in a CDR database 210. The CDR database 210 may be stored on a memory device such as a hard drive, a random access memory RAM, or a FLASH memory card. The call data records are then forwarded to a CDR processor 200 in order to determine whether or not the calls are potentially fraudulent. The output of CDR processor 200 is connected to an alert generator 230. If the information contained in the CDRs is determined by CDR processor 200 to be potentially fraudulent, alert generator 230 generates an alert and passes the alert through local telephone company 240 to a fraud monitoring center 250. The alert can be sent using an email message or sent as a data file using file transfer protocol (FTP). When fraud monitoring center 250 receives the alert from alert generator 230, a fraud analyst will review the alert and take appropriate actions.

Since the calls have already been completed, the appropriate action may be the addition of the billing number to a block list to prevent the future use of that billing number. In addition, the fraud analyst can perform a revenue study which determines whether or not it is economically feasible to impose a block on a particular leg of the fraudulent call (i.e. from NYC to Iowa PBX or from Iowa PBX to Iran).

Figure 3:
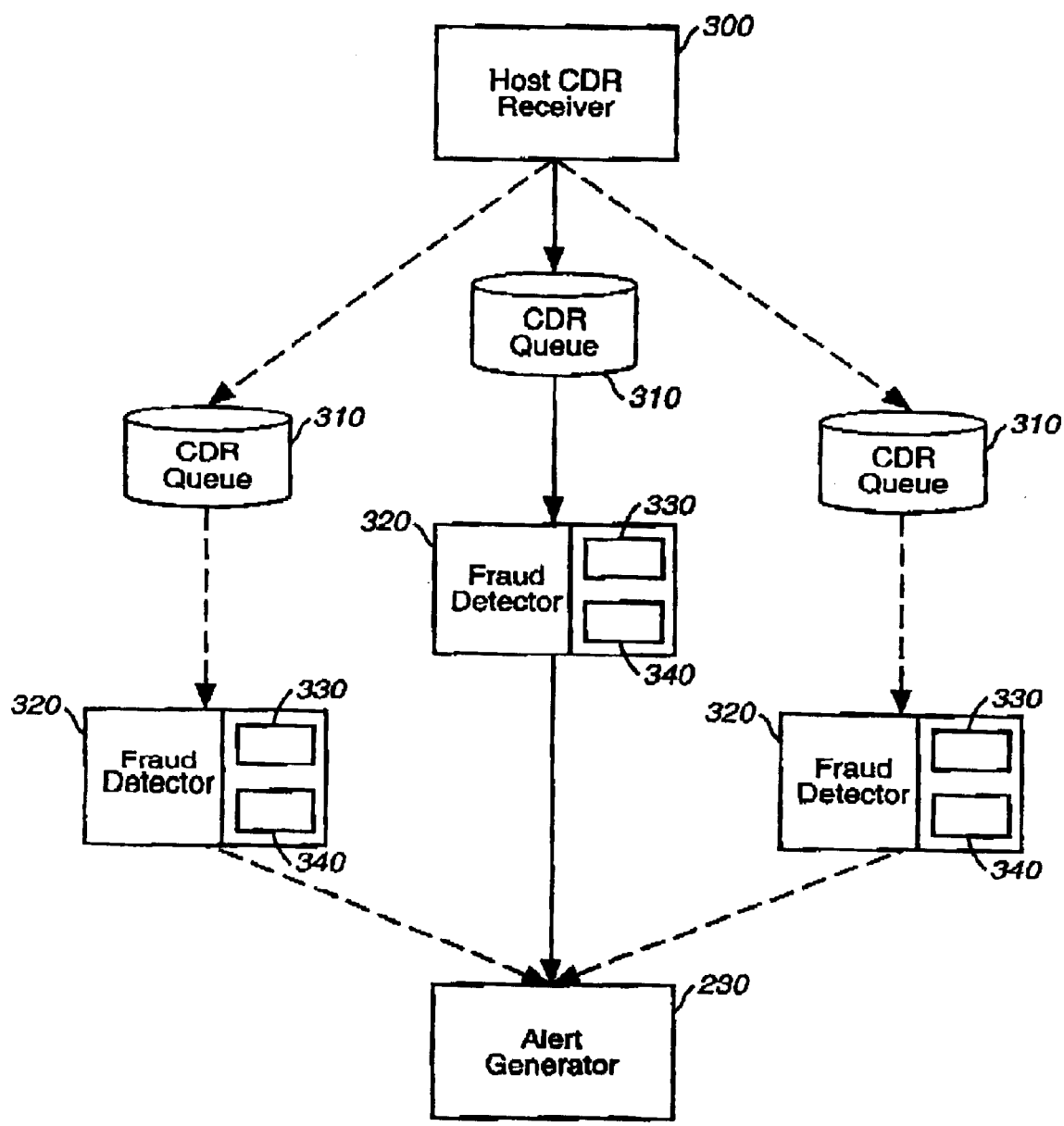
FIG. 3 is a diagram illustrating the different components of the CDR processor of FIG. 2, according to the present invention.

FIG. 3 refers to a diagram illustrating the different components of the CDR processor of FIG. 2, according to the present invention. It is understood that while the system of FIG. 3 is described in the singular sense, multiple systems can run simultaneously to reduce processing time and increase system redundancy. For example, separate systems, as described below, could handle all calls for a particular region or state, thus limiting the amount of data flowing into any one system.

The system for preventing fraudulent calls using a common billing number includes a host CDR receiver 300 for receiving individual call detail records from main frame 205. The call detail records received by CDR receiver 300 are stored in a CDR queue 310. CDR queue 310 stores the CDRs in a first-in-first-out (FIFO) manner. The call detail records are then forwarded to a CDR fraud detector 320 for further processing as described in FIGS. 4 and 5. Fraud detector 320 further comprises a fraud database 330 and an exception database 340 in order to help process the CDRs and detect fraud. The CDR queue acts as a temporary storage for the CDR fraud detector 320. Essentially, fraud detector 320 detects fraud by receiving a call detail record for each call entering and leaving a PBX, purging previously stored CDRs in a fraud database that are older than a current time less a predetermined period of time, comparing each current CDR billing number to previously stored billing numbers of CDRs in the fraud database 330, storing the current CDRs in the fraud database 330, and generating an alert when the billing number of the current CDR matches the billing number of a previously stored CDR. Depending upon whether or not CDR fraud detector 320 determines the presence of potential fraud, the CDRs are forwarded to alert generator 230 to generate an alert to a fraud analyst.

Figure 4:
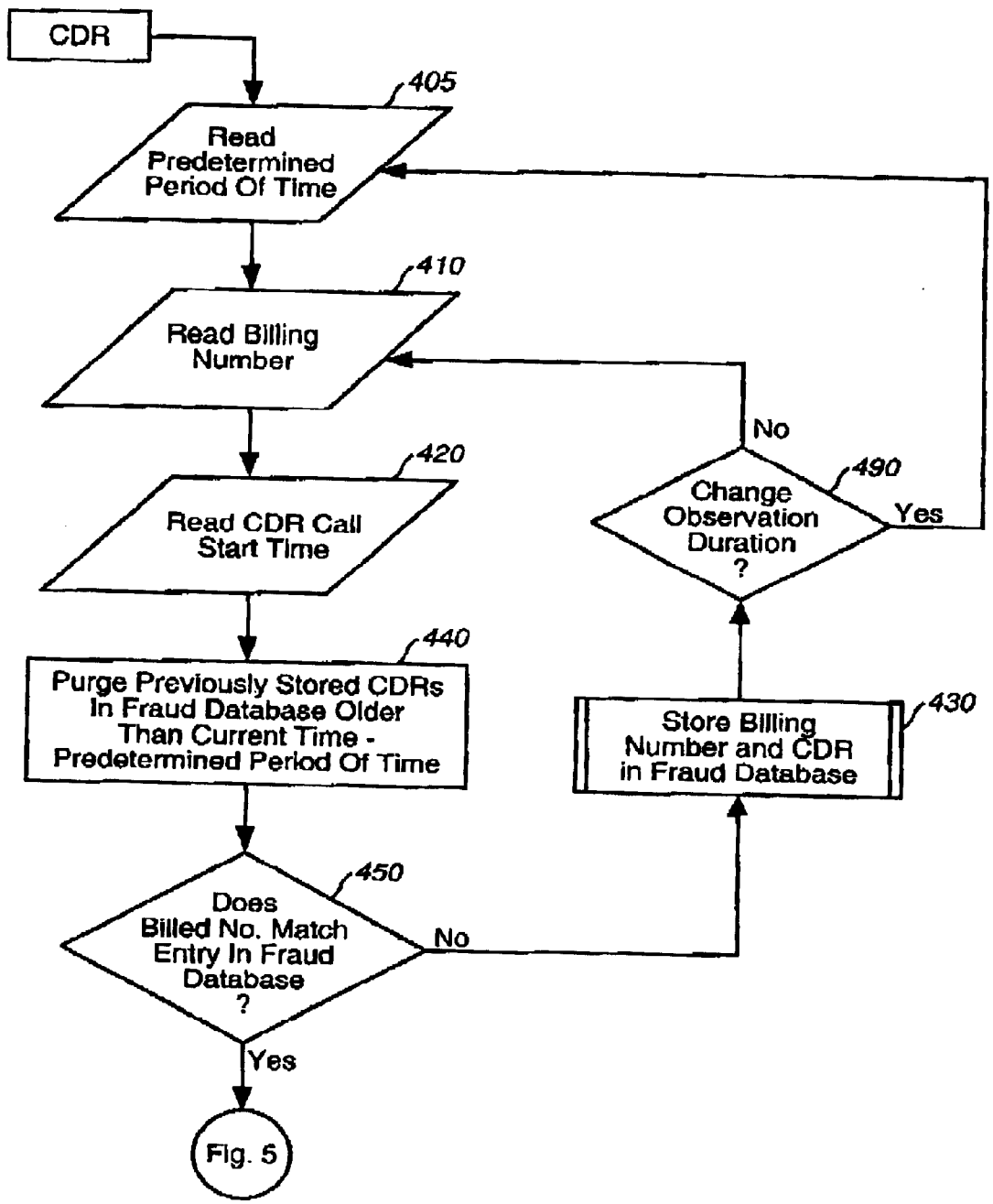
FIG. 4 is a detailed flow chart of the method performed by the CDR fraud detector of FIG. 3.

Referring now to FIG. 4, there is shown a detailed flow chart illustrating the method performed by CDR fraud detector 320 of FIG. 3. Once CDR fraud detector 320 receives the call detail records, fraud detector 320 reads a predetermined period of time in step 405. Next, fraud detector 320 reads a billing number field from the associated current CDR in step 410. Fraud detector 320 then reads a call start time field from the associated CDR in step 420. Proceeding to step 440, fraud detector 320 purges previously stored CDRs in a fraud database 330 that are older than the current time less the predetermined period of time. The purging of previously stored CDRs ensures that fraud detector 320 only examines those CDRs that fit within the predetermined period of time. The fraud analyst has the option of setting the predetermined period of time based upon his experience with fraud control. Typically, the predetermined period of time is short, on the order of two to three minutes, as hackers break in and commandeer an outside line with which to place another call. Therefore, calls which enter and exit the PBX using the same billing numbers within a predetermined period of time are deemed potentially fraudulent and generate an alert to a fraud analyst. It is understood, however, that the predetermined period of time may be reprogrammed by a fraud analyst.

Once previously stored CDRs have been purged from fraud database 330 in step 440, the process proceeds to step 450 wherein it is determined whether or not the billing number associated with the current call detail record matches a previous entry in the fraud database 330. If not, the process continues to step 430, where fraud detector 320 stores the billing number and the CDR in fraud database 330. The process then continues to step 490 wherein it is determined whether or not the fraud analyst wishes to change the predetermined period of time. If the fraud analyst decides to change the predetermined period of time, the process returns to step 405, or else the process returns to step 410.

Figure 5:
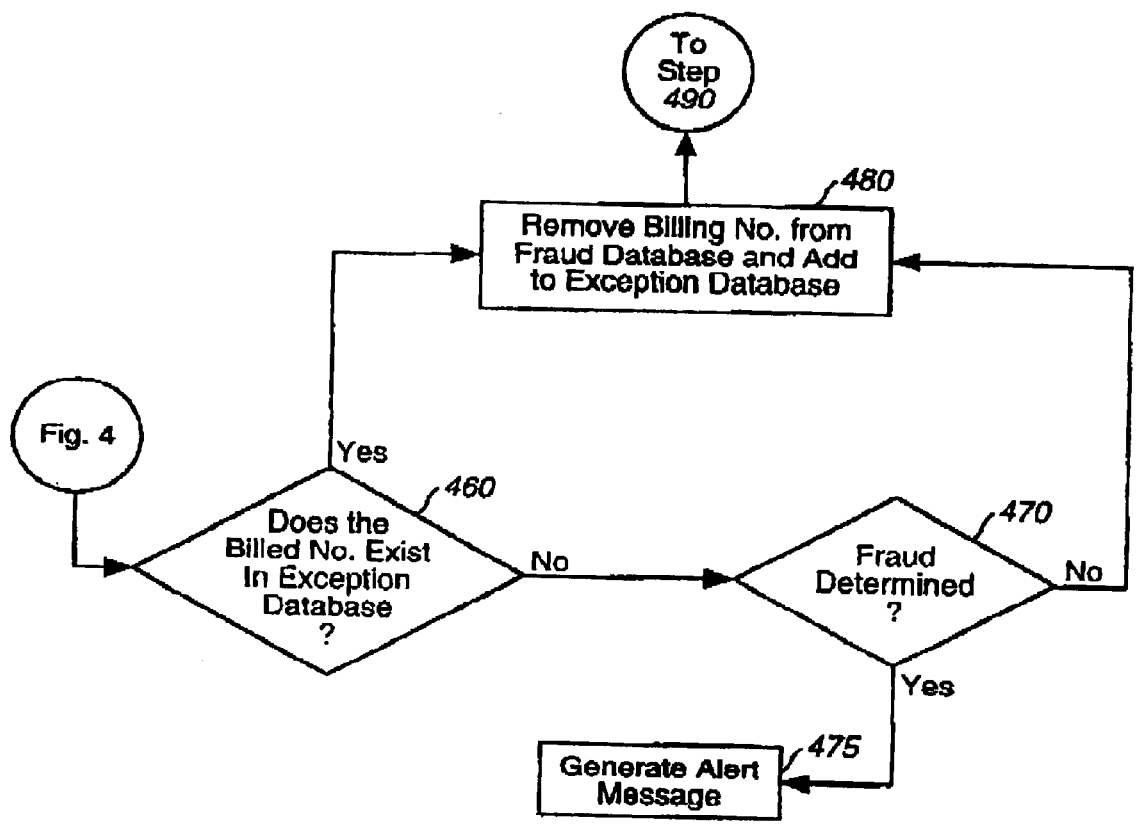
FIG. 5 is a continuation of the method performed by the CDR fraud detector of FIG.3.

Referring to FIG. 5, there is shown a continuation of the detailed flow chart illustrating the method performed by CDR fraud detector 320 of FIG. 3. If after step 450 it is determined that the billing number matches a previous entry in the fraud database 330, the process proceeds to step 460. It is determined, in step 460, whether or not the billing number exists in an exception database 340. The exception database 340 contains a list of information commonly contained in CDRs, namely an originating number, a terminating number, and a billing number, that has been determined by a fraud analyst not to be fraudulent. For example, if a legitimate particular billing number is used to dial in and out of the PBX, that number can be exempt from fraud analysis.

If the billing number exists in exception database 340, the process proceeds to step 480 wherein the billing number is removed from the fraud database 330, and the process proceeds to step 490. Removing the billing number from the fraud database 330 prevents the continued triggering of possible fraud for that number. If, however, the billing number is not located in the exception database, the process proceeds to step 470 wherein the fraud analyst determines whether or not fraud is actually present. The fraud analyst can rely on his professional experience and may use any known method of determining whether or not fraud is present. If the fraud analyst determines that fraud is not present, the process proceeds to step 480 wherein the billing number is removed from the fraud database 330 and added to exception database 340. If fraud is present, the process proceeds to step 475 wherein fraud detector 320 generates an alert message. The alert message is then forwarded to alert generator 230 for additional processing and forwarding to local telephone company 240.

In this manner, hackers who attempt to circumvent blocked leg 150 by dialing and breaking into PBX 110 using call looping are prevented from using PBX 110 in the future wherein a common billing number is being used fraudulently.

While an embodiment of the present invention has been shown and described, it is understood that many changes and modifications may be made thereunto without departing from the spirit and scope of the present invention as defined in the appended claims.

What is claimed is:

1. A system for monitoring a plurality of telephone calls to detect fraudulent activity, comprising;

receiving means for receiving a call detail record (CDR) corresponding to each of said calls made to and originating from a common switch, each of said CDR including a billing number associated with each respective call;

processor means for comparing the billing number of the CDR with billing numbers of previously stored CDRs in a fraud database to determine use of said billing number to access the switch within a predetermine period;

means for generating an alert if said billing number of said received CDR matches a billing number of a stored CDR in said fraud database; and means for purging said previously stored CDRs in said fraud database that are older than a current time less the predetermined period.

2. The system according to claim 1, wherein said means for generating an alert comprises:

means for determining whether said billing number of said CDR is included in an entry of an exception database; and means for preventing an alert if said billing number of said CDR is found in said exception database.

3. The system according to claim 2, wherein said billing number entries in said exception database are determined by a user including fraud analyst.

4. The system according to claim 1, wherein said predetermined period is determined by a user including a fraud analyst.

5. A method for monitoring a plurality of telephone calls to detect fraudulent activity, comprising the steps of:

receiving a call detail record (CDR) corresponding to each of said calls made to and originating from a common switch, said CDR including a billing number associated with each respective call;

retrieving a CDR, one at a time, from said queue means;

comparing, for each said CDR, said billing number with billing numbers of previously stored CDRs in a fraud database to determine use of said billing number to access the switch within a predetermined period;

generating an alert if said billing number of said received CDR matches a billing number of a stored CDR in said fraud database; and purging said previously stored CDRs in said fraud database that are older than a current time less the predetermined period.

6. The method according to claim 5, further comprising the steps of:

determining whether said billing number of said CDR is included in an entry of an exception database; and preventing an alert if said billing number of said CDR is found in said exception database.

7. The method according to claim 5, further comprising the steps of:

sending an electronic mail message including said CDR to a fraud monitoring center;

determining whether actual fraud exists by examining said CDR of said electronic mail message; and blocking access to the switch for said billing number if actual fraud is determined.

8. The method according to claim 5, further comprising the step of:

storing said CDRs in at least one queue means including a First-In First-Out (FIFO) queue means.

9. A system for monitoring a plurality of telephone calls to detect fraudulent activity, comprising;

a microprocessor that receives a call detail record (CDR) corresponding to each of said calls;

a memory device storing a received call detail record (CDR) including a billing number and corresponding to each of said calls made to and originating from a switch;

a fraud database storing CDRs prior to the received CDR;

a CDR processor configured to compare said billing number of said CDR with a billing number of previously stored CDRs stored in said fraud database to determine use of said billing number to access the switch within a predetermined period; and an alert generator configured to generate an alert if said billing number of said received CDR matches a billing number of a previously stored CDR in said fraud database, wherein said stored CDRs that are older than a current time less the predetermined period are purged from said fraud database.

10. A method for preventing call looping in a private branch exchange (PBX), the method comprising:

receiving a first record associated with a first call leg placed to the PBX, the first record specifying a first billing number;

retrieving a second record from a fraud database, the second record being associated with a second call leg placed from the PBX, the second record specifying a second billing number;

comparing the first billing number with the second billing number for a match to determine whether the call legs were established within a predetermined period of time; and selectively generating an alert based upon the comparing step.

11. The method according to claim 10, further comprising:

purging the second record from the fraud database after expiration of the predetermined period.

12. The method according to claim 10, further comprising:

determining whether the matched billing number is in an exception database, wherein the alert is not generated if the matched billing number is in the exception database.

13. The method according to claim 10, wherein the first record and the second record are call detail records (CDRs).

* * * * *